Sept. 21, 1965   K. H. HACKLÄNDER   3,207,646
METHOD OF ALTERING THE SURFACE STRUCTURE OF WEBS OF FOAM
PLASTIC AND OF UNITING A SUPPORT WEB TO THE TREATED WEB
Filed Dec. 17, 1962
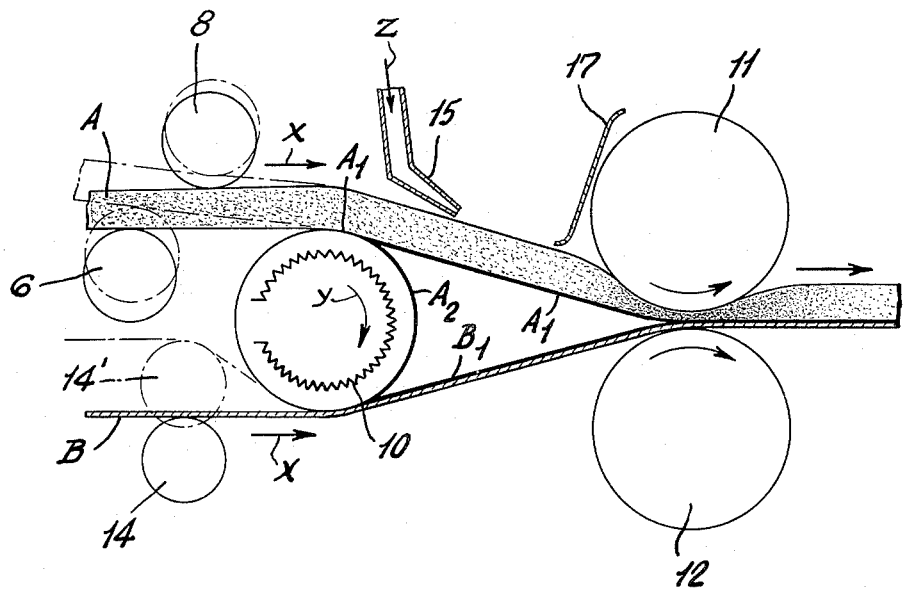
INVENTOR
KARL HERMANN HACKLÄNDER
BY
ATTORNEYS

United States Patent Office 3,207,646
Patented Sept. 21, 1965

3,207,646
METHOD OF ALTERING THE SURFACE STRUCTURE OF WEBS OF FOAM PLASTIC AND OF UNITING A SUPPORT WEB TO THE TREATED WEB
Karl Hermann Hacklander, London, England, assignor to Agricola Reg. Trust, Vaduz, Liechtenstein
Filed Dec. 17, 1962, Ser. No. 245,117
Claims priority, application Germany, Dec. 18, 1961, A 39,044
5 Claims. (Cl. 156—281)

This invention relates to a method of altering the surface structure of webs of plastic foam. It is known to alter the surface structure of such webs, particularly of foam material on a polyurethane basic effecting a plasticising or melting of the uppermost layer of the said web by intensive heat treatment and then exerting a rolling or smoothing action on the plasticised or melted mass by mechanical means. In such methods the melting or plasticising of the uppermost layer of the web of foam material is effected either by direct contact between the said web and heated rollers or by the action of intensive infrared radiation or even gas flames directly onto the surface of the foam web.

However, the surface structure of the foam web obtainable in this way does not come up to practical requirements in many cases. In particular one cannot obtain in this way a surface which, whilst keeping its porosity, has a sticky, velvety character, that is to say, for example, a surface which, when it is in contact with a rough textile fabric, for example the surface of a carpet, adheres well to the latter and cannot "travel" relatively to the textile fabric or the like.

In order to obtain such a sticky, velvety surface structure on a web of foam material, the invention proposes that hot air should be blown onto the surface of the web of foam material being fed to a calendering roll gap shortly before it is introduced into the said gap, this being done preferably at an acute angle and by means of a narrow nozzle extending over the entire width of the web of foam material, and then exerting a pressure on the foam surface thus pre-treated by means of a cold calender roll. The hot air may be blown at an acute angle onto the surface of the web either in the direction of feed of the web towards the calender roll gap or against this direction of feed.

By blowing hot air onto the surface of the foam web, whilst retaining the pores on the surface of the foam web, the pore walls of the exposed foam cells are rendered plastic, so that on subsequent cold rolling in the calender roll gap, the desired sticky, velvety surface is obtained.

The giving of a velvet character to one surface of the web of foam material may be carried out according to the invention at the same time as the hitherto usual thermal and subsequent mechanical treatment of the other surface of the foam web, that is to say, for example, at the same time as giving a leather character to the other web surface or even at the same time as coating the other web surface with a plastic foil, a nap or flat fabric, a woven texture or the like.

To carry the method according to the invention into effect, use is made preferably of a device, in which in front of a calender roll gap there is arranged a drum capable of being heated, the periphery of which is in contact with the web of foam material being fed to the roll gap for the purpose of plasticising or melting of the surface of said web, and in which a hot air nozzle extending over the entire width of the foam web and adapted to blow on the side of the foam web remote from the drum is arranged between the drum capable of being heated and the calender roll gap. If in such a device the blowing of the hot air takes place in the direction of feed of the foam web, it is advisable to arrange in front of the calender roll gap a screen preventing the hot air from impinging on the calender roll.

One embodiment according to the invention is shown diagrammatically in the single figure of the accompanying drawing.

In front of a calender roll gap formed by the rolls 11 and 12 is arranged a heated drum 10 which rotates in the direction of arrow y. A web A of foam material is fed in the direction of arrow x over the heated drum 10 to the calender roll gap 11, 12, whilst a web B, which may consist for example of a textile fabric or even of paper, board, plastic foil, cork, leather, linoleum or the like, is likewise fed in the same direction x over the heated drum 10 to the calender roll gap.

The heated drum 10 serves for the plasticising or melting of one surface layer of the foam web A and is therefore kept at a suitable temperature (300 to 500° C.). The extent of the temperature depends on the speed of rotation of the drum 10, the rate of feed of the foam web A and the extent of contact between drum and foam web. In the case of foam webs on a polyurethane basis the maintenance of a temperature of 400 to 450° C. is advisable. Two guide rolls 6, 8 arranged in the path of the foam web A in front of the heated drum 10 are adjustable not only relatively to one another according to the thickness of the foam web A, but also in such a way that the length of the foam web A coming into contact with the periphery of the drum 10 can be varied. The plasticising or melting of the surface on the underside of the foam web A can be carried out instead of by the drum 10 or in addition thereto by a source of heat arranged between the roll 6 and the drum 10, which by heat radiation or by direct flame action melts the foam web to an extent desired in any particular case. Such a source of heat may be in particular electric or gas-operated infra-red radiating devices or gas flames sweeping the surface of the foam web.

The main function of the drum 10 consists of removing a part of the mass of foam material plasticised either by the drum itself or by a source of heat arranged before same and transferring the said part onto the support web B also running in contact with the drum. Thus a part of the said plasticised or melted mass of the foam web remains as a sticky layer $A_1$ on the foam web A whilst another part is taken by the drum as a layer $A_2$ and transferred onto the support web B. On the way from the drum 10 to the calender roll gap 11, 12 this transferred part of the plasticised mass forms on the support web B a support layer $B_1$, which, as the layer $A_2$ on the drum 10 is constantly heated, has a sufficiently fluid consistency to be able to penetrate to a certain extent, for example, the pores of a fabric of which the support web B consists and nevertheless form a sticky layer on the surface of the web B.

In the path of the support web B to the drum 10 there is located a roll 14 which is so adjustable in height (14') that the length over which the web B is in contact with the periphery of the drum 10 can be varied. In this way one is able to vary the duration of the heat action of the web 10 on the web B, and thus either give the said web the desired temperature or even melt it on its surface nearest the drum, if it consists of a thermoplastic material, and depositing the layer $B_1$ on this melted surface.

In the calender roll gap 11, 12 the layers $A_1$ and $B_1$ consisting of the same material come into contact with one another, so that on solidification of the said layers under the influence of the low temperature of the calender rolls, a really rigid connection between the foam web A and the support web B is made.

Between the drum 10 and the upper calender roll 11 is arranged a hot air nozzle 15, to which hot air is supplied in the direction of arrow z. The hot air nozzle 15 has a narrow air outlet gap and extends over the entire width of the foam web A. The arrangement of the hot air nozzle is preferably such that the hot air leaving it forms an acute angle with the surface of the foam web A, the surface of the foam webs is thus swept only superficially and the hot air does not penetrate deeply into the foam web, which in the case of many foam materials may have the consequence of undesirably diminishing the foam structure over the entire thickness of the web.

In the embodiment illustrated the blowing of the hot air onto the surface of the foam web remote from the heated drum 10 is effected in the direction of feed of the foam web towards the calender roll gap. In this case it is advisable to provide a screen 17 in front of the calender roll 11 through which the hot air above the roll 11 is deflected and the roll is thus not heated. The blowing of the hot air may, however, also take place against the direction of feed of the foam web A.

When the surface of the foam web heated by the hot air comes into contact with the cold or cooled calender roll 11 on entering the calender roll gap, this surface of the foam web is given a velvet character, i.e. the foam surface thus treated is sticky so that it adheres well to textile webs or the like.

Should it be desired by means of a device of the above-mentioned kind to give foam webs a velvet character on one surface whilst the foam character of the other surface is maintained, the heating of the drum 10 arranged in front of the calender roll gap is switched off and the foam web A is guided through the calender roll gap without the applying of a support web B.

If it is desired to produce webs of foam material which have a velvet character on one surface but on the other surface are coated with a plastic foil or the like or a textile fabric B, the heating of the drum 10 is switched on and with simultaneous feed of the web B to the calender roll gap, coating and the giving of a velvet character to the foam web are carried out simultaneously on the surfaces remote from one another. In a corresponding way one may also produce foam webs which, for example, have a leather character on one surface and a velvet character on the remote surface.

I claim:

1. A method of producing a velvet like non-slip surface on mature expanded sheet polyurethane, said method comprising the steps of heating the surface for a limited period by directing upon it a stream of hot air to raise the temperature of the material at the said surface sufficient to render plastic the walls of the pores of the material, but without melting the material, or rendering it tacky, and immediately thereafter cooling the said surface rapidly under pressure.

2. A method of producing a velvet like non-slip surface on mature expanded sheet polyurethane, said method comprising the steps of moving the material before a stream of hot air directed upon the surface of the material to be treated, the temperature of the air being such as to raise the temperature of the material at the said surface sufficient to render plastic the walls of the pores of the material without melting the material or rendering it tacky, and immediately after causing the material to make contact with a cooling surface under pressure.

3. A method of producing a velvet like non-slip surface on mature expanded sheet polyurethane, said method comprising the steps of moving the material before a stream of hot air directed obliquely upon the surface of the material to be treated, the temperature of the air and the speed of motion of the material being such as to raise the temperature of the material on the said surface sufficient to render plastic the walls of the pores of the material without melting the material, or rendering it tacky, and immediately thereafter cold rolling the material in a calender roll gap.

4. A method of producing a velvet like non-slip surface on one side of mature expanded sheet of polyurethane, as claimed in claim 3, further comprising the step of simultaneously laminating a support web on the other side of the material.

5. A method of producing a velvet like non-slip surface on one side of mature expanded sheet of polyurethane as claimed in claim 3 further comprising the step of simultaneously modifying the other side of the material including raising the temperature of the same.

References Cited by the Examiner

UNITED STATES PATENTS

| | | | |
|---|---|---|---|
| 2,678,679 | 5/54 | Bergstein | 156—82 |
| 2,346,201 | 4/44 | Vantier | 264—321 XR |
| 2,629,899 | 3/53 | Aller | 264—321 XR |
| 2,786,233 | 3/57 | Merrill | 18—10 |
| 2,861,022 | 11/58 | Lundsager | 156—322 XR |
| 2,867,222 | 1/59 | Otto et la. | 264—321 XR |
| 2,893,877 | 7/59 | Nickolls | 264—48 XR |
| 2,957,793 | 10/60 | Dickey | 156—82 |
| 2,960,425 | 11/60 | Sherman | 156—82 |
| 3,061,885 | 11/62 | Rogers et al. | 264—50 |
| 3,072,961 | 1/63 | Gilbert | 18—10 |
| 3,075,868 | 1/63 | Long | 264—80 |
| 3,104,192 | 9/63 | Hacklander | 264—321 XR |
| 3,112,524 | 12/63 | Legler | 264—321 XR |

FOREIGN PATENTS

| | | | |
|---|---|---|---|
| 599,493 | 6/60 | Canada | 264—48 |

ALEXANDER H. BRODMERKEL, *Primary Examiner.*